United States Patent
Martin et al.

(10) Patent No.: US 6,529,017 B2
(45) Date of Patent: Mar. 4, 2003

(54) CAPACITANCE LEVEL MEASUREMENT CIRCUIT AND SYSTEM

(75) Inventors: Barry E. Martin, Cleveland, TN (US); Stephen Tymoszuk, Knoxville, TN (US); Benjamin N. Lease, Knoxville, TN (US)

(73) Assignee: RobertShaw Controls Company, Richmond, VA (US)

( * ) Notice: Subject to any disclaimer, the term of this patent is extended or adjusted under 35 U.S.C. 154(b) by 0 days.

(21) Appl. No.: 09/835,272

(22) Filed: Apr. 13, 2001

(65) Prior Publication Data

US 2002/0008526 A1 Jan. 24, 2002

Related U.S. Application Data

(60) Provisional application No. 60/197,195, filed on Apr. 14, 2000.

(51) Int. Cl.[7] ............ G01R 27/26; G01F 23/00
(52) U.S. Cl. ............ 324/690; 324/686; 324/669; 73/304 C
(58) Field of Search ............ 324/658, 663, 324/669, 674, 677, 684, 686, 690, 659; 73/304 C

(56) References Cited

U.S. PATENT DOCUMENTS

| | | | |
|---|---|---|---|
| 2,544,685 A | 3/1951 | Jackson | |
| 2,929,021 A | 3/1960 | Shillington | |
| 2,940,037 A | 6/1960 | Lide | |
| 3,612,997 A | 10/1971 | Paulkovich | |
| 3,774,238 A | 11/1973 | Hardway | |
| 4,383,444 A | 5/1983 | Beaman et al. | |
| 4,558,274 A | 12/1985 | Carusillo | |
| 4,590,575 A | * 5/1986 | Emplit | 702/52 |
| 4,679,433 A | * 7/1987 | Clinton et al. | 73/304 C |
| 5,073,757 A | 12/1991 | George | |
| 5,136,251 A | 8/1992 | George et al. | |
| 5,278,513 A | * 1/1994 | Kramer et al. | 324/611 |
| 5,469,354 A | 11/1995 | Hughey et al. | |
| 5,576,628 A | * 11/1996 | Caliboso et al. | 324/115 |
| 6,016,697 A | 1/2000 | McCulloch et al. | |

FOREIGN PATENT DOCUMENTS

DE    43 29 571 A1    3/1994

* cited by examiner

Primary Examiner—N. Le
Assistant Examiner—James Kerveros
(74) Attorney, Agent, or Firm—Robert J. Hampsch, Esq.; Richard L. Sampson, Esq.

(57) ABSTRACT

A capacitance measurement circuit and probe includes a drive circuit couplable to a constant-current source, a threshold detector, a probe capacitor, and a reference capacitor. The circuit includes a plurality of switches being actuatable to alternately couple the current source to the probe capacitor and to the reference capacitor. The drive circuit is configured to alternately generate a signal of linear ramp waveform having a slope that is proportional to the magnitude of capacitance of the probe capacitor and of the reference capacitor. The voltage differential between the probe capacitor and reference capacitor are actively nulled to nominally eliminate a parasitic capacitance therebetween.

25 Claims, 7 Drawing Sheets

CAPACITANCE LEVEL MEASUREMENT CIRCUIT AND SYSTEM

RELATED APPLICATION

This application claims the benefit of U.S. Provisional Application Ser. No. 60/197,195, filed on Apr. 14, 2000.

BACKGROUND INFORMATION

This invention relates to capacitance measurement probes, and more particularly, to a capacitance probe and operational circuitry therefor.

Capacitance probes are often used to measure the level of a material in a tank or other compartment. As the material rises in the compartment, it replaces the air between two electrodes or conductors. If the material has a higher dielectric constant than air, the total capacitance of the system is increased as the compartment is filled. This increase in capacitance provides an indication of the amount of material in the compartment.

In order for capacitance probes to operate in this setting, a pair of conductors must be spaced such that the material to be measured may fill the space therebetween. If the probe is to be inserted into conductive materials, then it must also incorporate some method of electrically insulating the conductors from one another.

One capacitive apparatus, shown in U.S. Pat. No. 3,774,238 to Hardway, uses two long tubes or rods 26, 27 insulated from each other in a spaced apart relationship by plastic insulators 28.

Another type of capacitance probe, shown in U.S. Pat. No. 5,397,995 to Anderson, includes an outer conductor and a spaced inner conductor. The space between conductors insulates the conductors from one another and allows the material to be measured to fill the space.

A drawback of known capacitance probes is their susceptibility to inaccuracies due to capacitances, commonly known as 'parasitic capacitances', that exist between various components of the capacitance measurement circuit, including the probe itself. Moreover, these parasitic capacitances are often variable, being influenced by ambient temperature and/or humidity. Thus, a need exists for an improved capacitance measurement probe and circuitry therefor.

SUMMARY

According to an embodiment of this invention, a capacitance measurement circuit includes a selection/shield drive circuit having a power port couplable to a constant-current source, a detector port couplable to a threshold detector, a probe port couplable to a probe capacitor, and a reference port couplable to a reference capacitor. The circuit also includes a plurality of switches being actuatable to alternately couple said power port to said probe port and to said reference port. The selection/shield drive circuit is configured to alternately generate a signal of linear ramp waveform having a slope that is proportional to the magnitude of capacitance of a probe capacitor and reference capacitor coupled to the probe port and to the reference port.

In a variation, the present invention may include a capacitance probe including this capacitance measurement circuit.

In a further aspect of this invention, a capacitance measurement circuit includes a constant-current source, a threshold detector, a selection/shield drive circuit coupled to the constant-current source and to the threshold detector. The selection/shield drive circuit includes a probe port couplable to a probe capacitor, a reference port couplable to a reference capacitor, and a plurality of switches configured to alternately couple the constant-current source to the probe port and to the reference port. The selection/shield drive circuit is configured to generate a signal of linear ramp waveform having a slope that is proportional to the magnitude of capacitance of the probe capacitor and reference capacitor alternatively coupled thereto. The threshold detector is configured to indicate when the linear ramp waveform reaches a threshold voltage.

In yet another aspect of the invention, a method of fabricating a capacitance measurement circuit includes providing a selection/shield drive circuit having a power port couplable to a constant-current source, a detector port couplable to a threshold detector, a probe port couplable to a probe capacitor, and a reference port couplable to a reference capacitor. The drive circuit is also provided with a plurality of switches being actuatable to alternately couple said power port to said probe port and to said reference port. The method also includes configuring the selection/shield drive circuit to alternately generate a signal of linear ramp waveform having a slope that is proportional to the magnitude of capacitance of a probe capacitor and reference capacitor coupled to the probe port and to the reference port.

In another aspect, the present invention includes a method of determining the capacitance of a capacitance probe. The method includes providing a selection/shield drive circuit, coupling a constant-current source to the selection/shield drive circuit, coupling a probe capacitor to the selection/drive circuit, coupling a reference capacitor to the selection/drive circuit, and providing the selection/drive circuit with a plurality of switches being actuatable to alternately couple the constant-current source to the probe capacitor and to the reference capacitor. The method also includes configuring the selection/shield drive circuit to alternately generate a signal of linear ramp waveform having a slope that is proportional to the magnitude of capacitance of a probe capacitor and reference capacitor coupled to said probe port and to said reference port, and actuating the switches to alternately couple the constant-current source to the probe capacitor and to the reference capacitor. The selection/shield drive circuit is used to alternately generate a signal of linear ramp waveform having a slope that is proportional to the magnitude of capacitance of a probe capacitor and reference capacitor. A voltage differential of substantially zero volts is maintained between the reference capacitor and the probe capacitor during said use of the selection/shield drive circuit.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
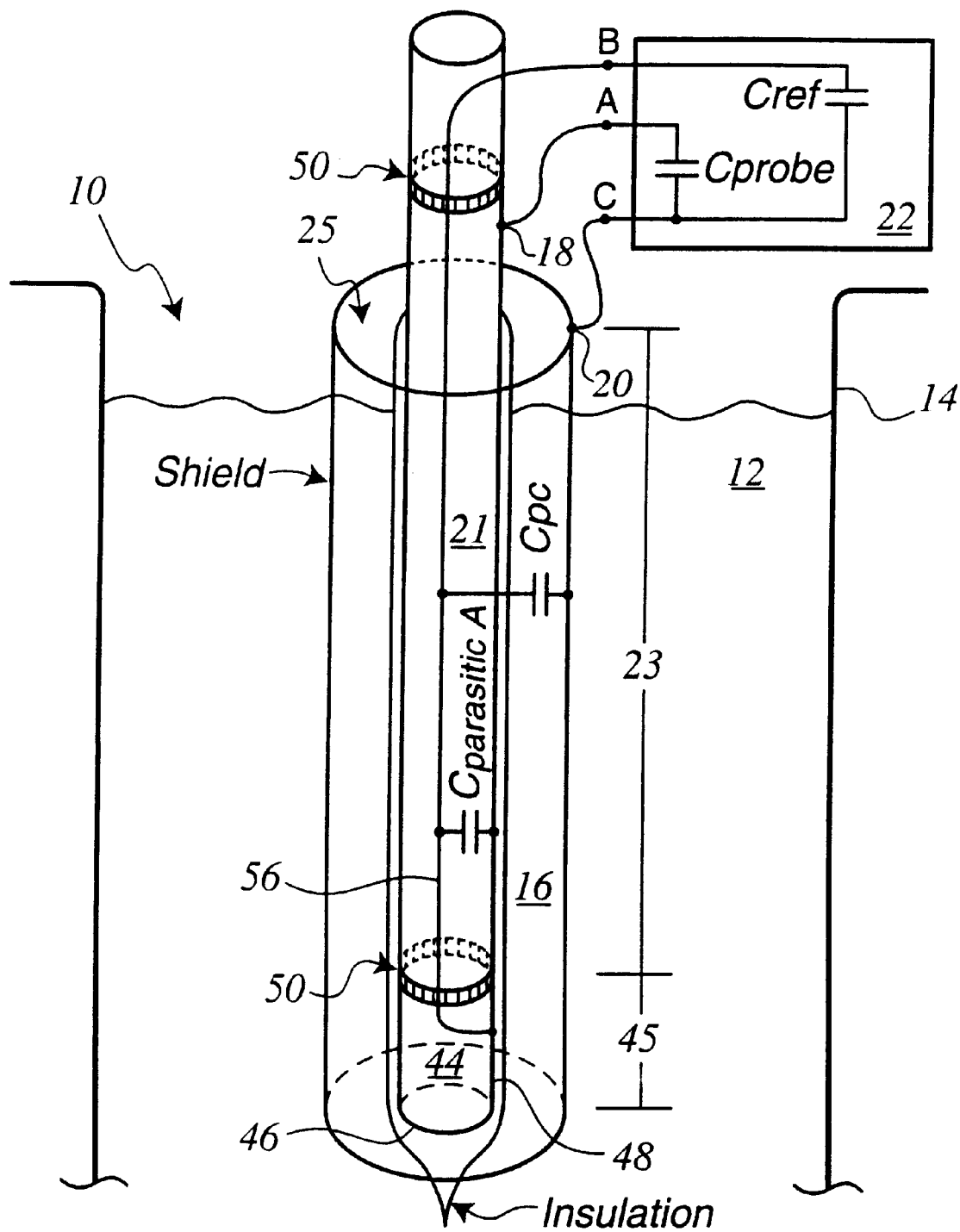
FIG. 1 is a schematic representation of a capacitance probe of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Figure 2A:
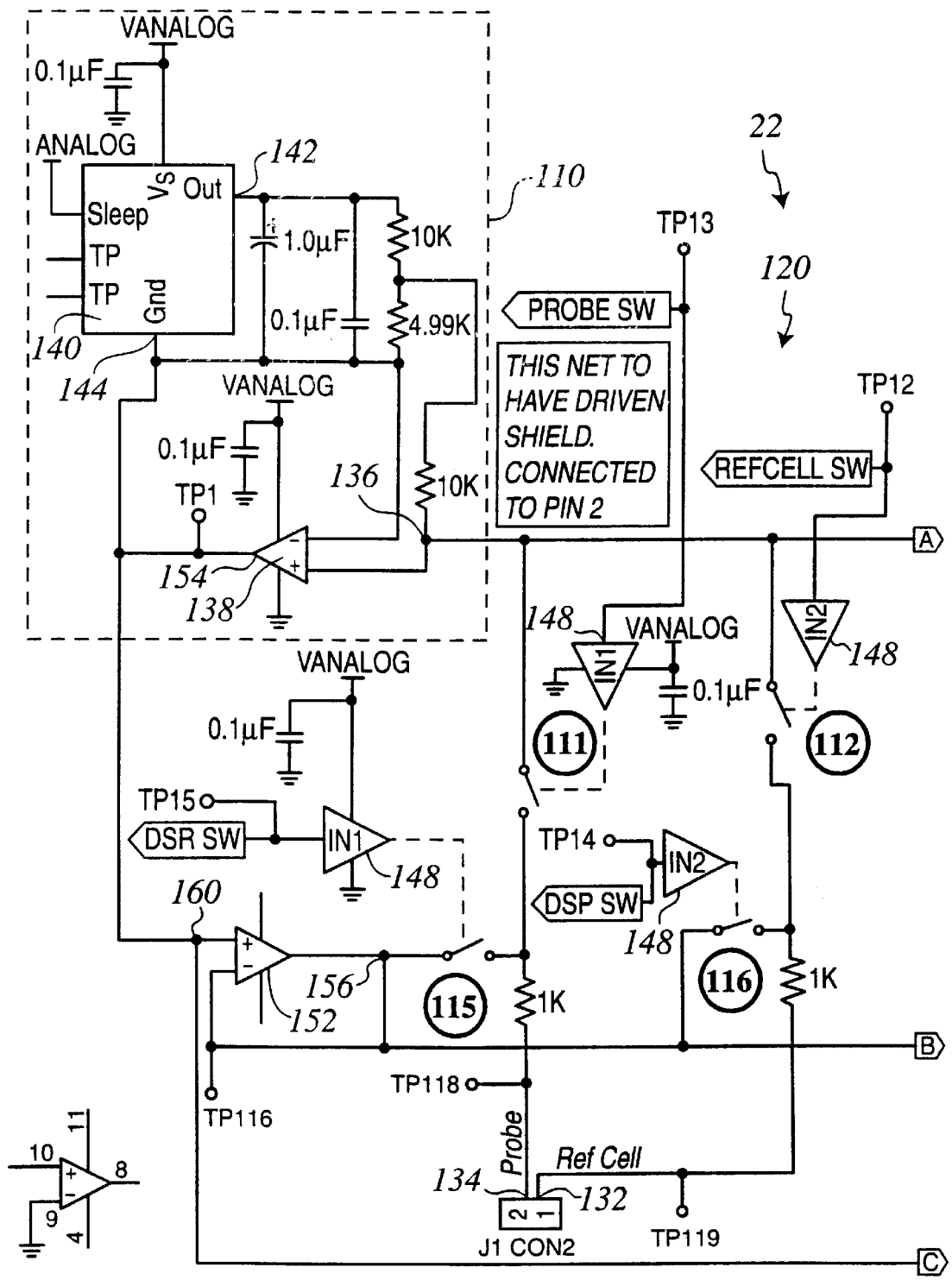
FIG. 2A is a schematic representation of measurement circuitry of the present invention, useful in operating the capacitance probe of FIG. 1.

As shown in FIGS. 1 & 2A, the subject invention includes a measurement circuit 22 that may be used in combination with a capacitance probe 10 to measure the level of a material 12 in a compartment 14. Probe 10 generally includes a probe capacitor 21 (to measure the material level), and a reference capacitor (cell) 44 used to calibrate the probe capacitor 21 for a particular material 12 being measured. The measurement circuit 22 actively compensates for parasitic capacitances that typically exist between the probe capacitor 21 and the reference cell 44. Circuit 22 accomplishes this functionality by supplying a constant current to the probe capacitor 21 upon initiation of measurement. This constant current generates a voltage across the capacitor 21 that is a linear ramp waveform having a slope that is proportional to the magnitude of the capacitance. A timer measures the time elapsed ("t") between the initiation of measurement and the time at which the voltage waveform reaches a predetermined level (e.g., 2 volts). This time value "t" is proportional to the value of the capacitance of probe capacitor 21. This parasitic capacitance (i.e., between the capacitor 21 and cell 44) is actively eliminated by maintaining voltage across reference cell 44 at the same level as that across capacitor 21 during the measurement cycle. Maintaining these nominally identical voltages substantially eliminates any voltage difference between capacitor 21 and cell 44 to nominally eliminate this parasitic capacitance. A similar sequence of events is effected for measurement of reference cell 44. In this manner, embodiments of the present invention enable relatively accurate measurements of the capacitances of probe capacitor 21 and reference cell 44.

Referring now to FIGS. 1–4, embodiments of the present invention will be described in greater detail. As shown in FIG. 1, the subject invention includes a capacitance probe 10 for use in measuring the level of(i.e., depth of insertion of the probe 10 within) a material 12 in a compartment 14. Probe 10 may be of the type set forth in U.S. Pat. No. 6,380,750, entitled Capacitance Probe and Spacer Therefor, issued on Apr. 30, 2002, and which is fully incorporated herein by reference. In one particular setting, probe 10 has been found to be advantageous in measuring levels of fuel in fuel tanks.

As shown, probe 10 forms a probe capacitor 21 exhibiting a capacitance indicated as $C_{probe}$ in FIG. 1. As material 12 rises in a compartment (e.g., tank) 14, it passes into a space 16 between two electrodes or conductors 18, 20 that are coupled to electronic module (i.e., circuitry) 22, which is described in greater detail hereinbelow. Air, or other gas, escapes from space 16 through openings 25 in outer conductor 20 as material 12 rises into space 16. If material 12 has a higher dielectric constant than air, then the capacitance $C_{probe}$ of probe capacitor 21 (i.e., the capacitance between conductors 18, 20), is increased as compartment 16 is filled. This increase in capacitance provides an indication of the amount (i.e., level) of material 12 in compartment 14.

As also shown, capacitance probe 10 may include a reference cell (i.e., capacitor) 44 located at a distal end 46 of, and concentrically with, inner conductor 18. Reference cell 44 functions as a relatively small capacitor of known size allowing automatic calibration for the dielectric of the particular material 12 in compartment 14. Cell 44 thus nominally eliminates the need to calibrate a measurement in the field and allows the system, i.e., probe 10 and circuitry 22, to conveniently compensate for materials 12 of various dielectrics.

Reference cell 44 includes a first reference conductor 48 attached using a non-conducting stand-off 50 to distal end 46 of inner conductor 18. Both conductor 48 of reference cell 44, and conductor 18 of capacitor 21, are electrically connected to circuitry 22 by an electrical conductor (e.g., wire) 56 that runs nominally through the center of inner conductor 18.

In operation, capacitance probe 10 is inserted at least partly within a compartment 14 having a material 12 therein. As material 12 from compartment 14 enters space 16 between inner conductor 18 and outer conductor 20, the presence of material 12 serves to alter the electrical field between inner and outer conductors 18, 20. Circuitry 22 measures the capacitance between conductors 18, 20 and derives from the capacitance measurements a signal proportional to the level of material 12 within opening 16. Componentry and operation of circuitry 22 will be discussed in greater detail hereinbelow. Since reference cell 44 is completely submerged within material 12, its capacitance $C_{ref}$ provides a value for a known level (height) of material 12. The two capacitors 21 and 44 of probe 10 may thus be used as variable capacitors to measure material level in tank 14.

Figure 3:
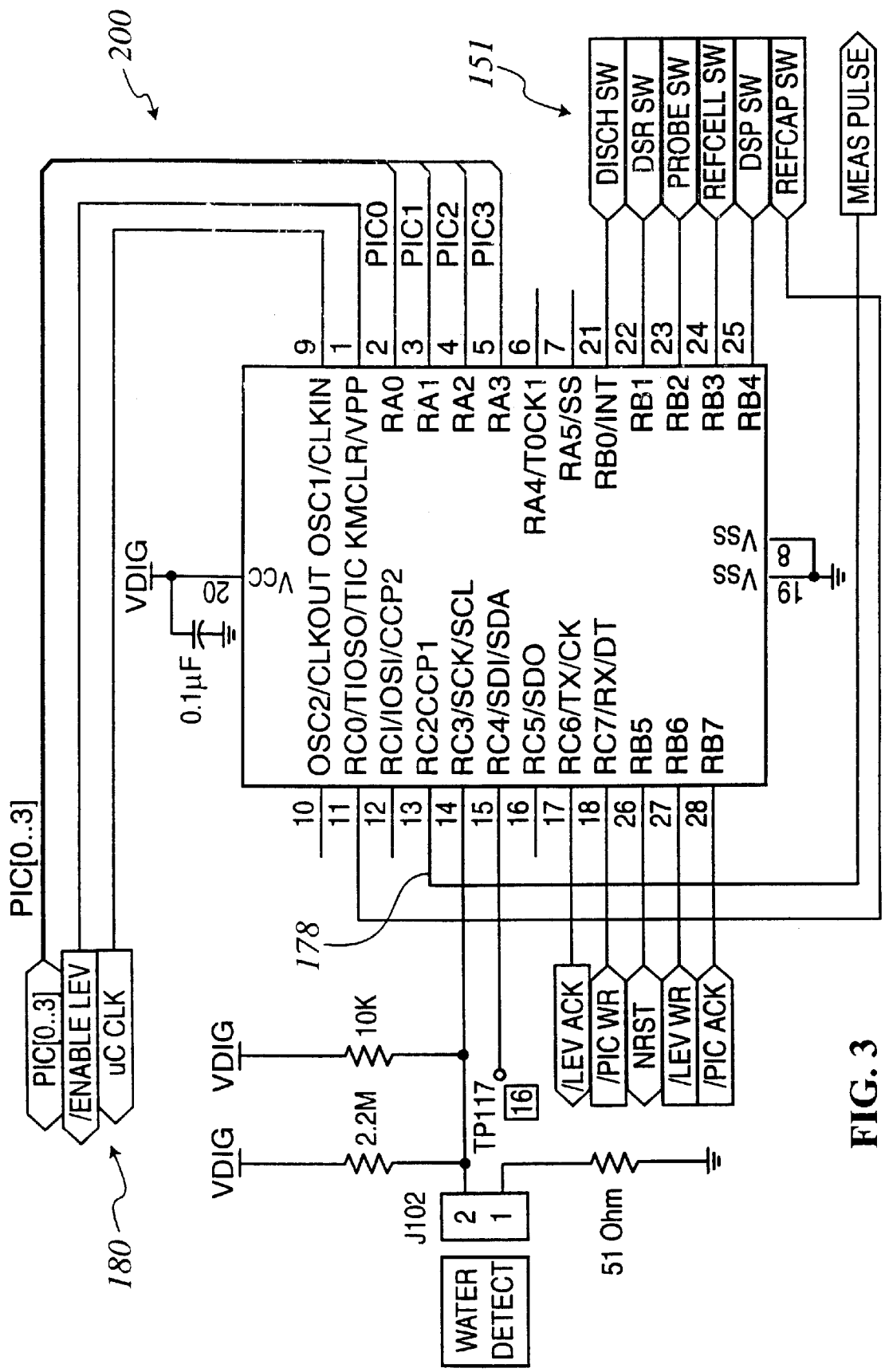
FIG. 3 is a schematic representation of a processor used to operate the circuitry of FIG. 2A.
Figure 4A:
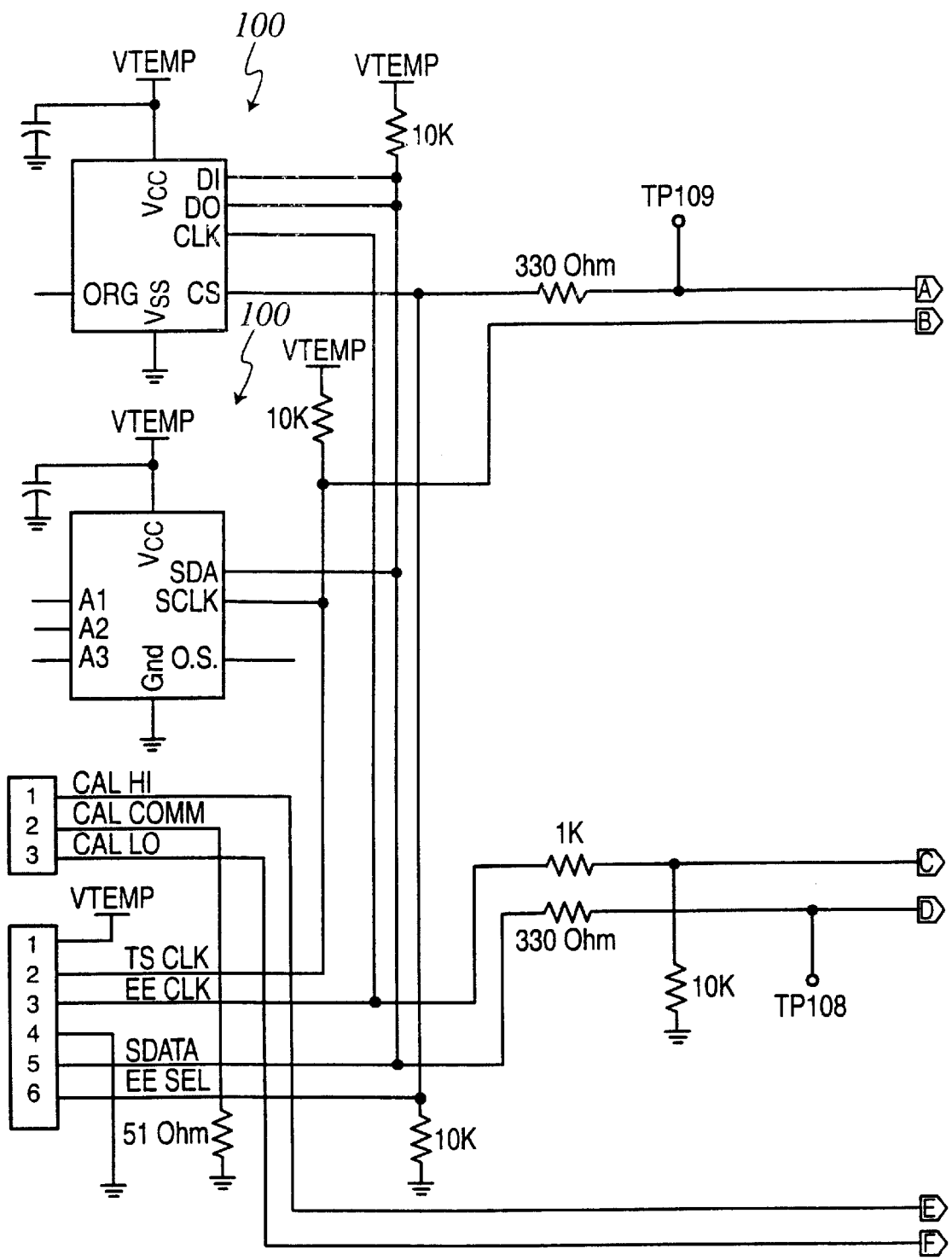
FIG. 4 is a schematic representation of additional and/or optional componentry coupled to the circuitry of FIGS. 2A and 3.
Figure 4B:
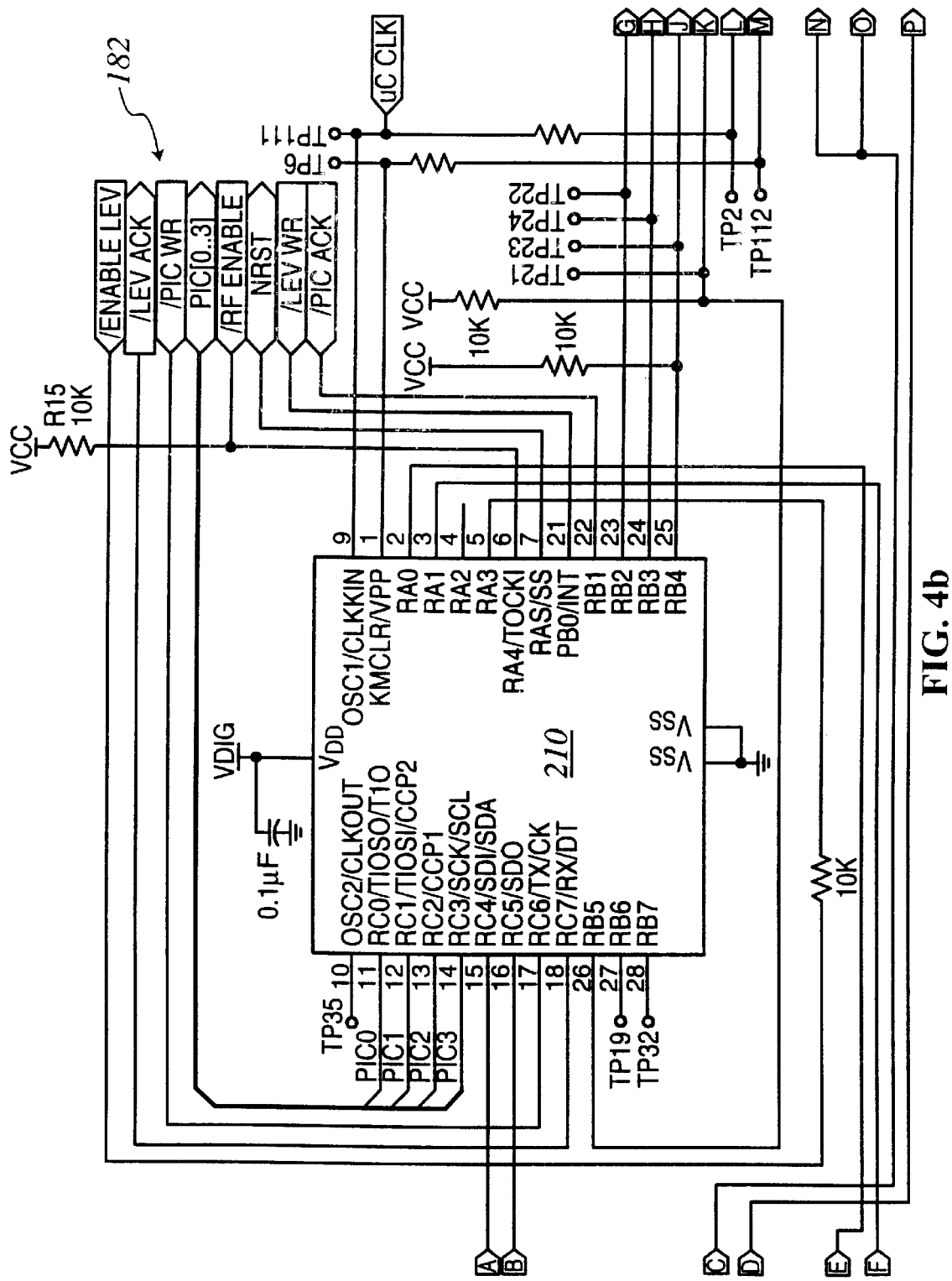
Figure 4C:
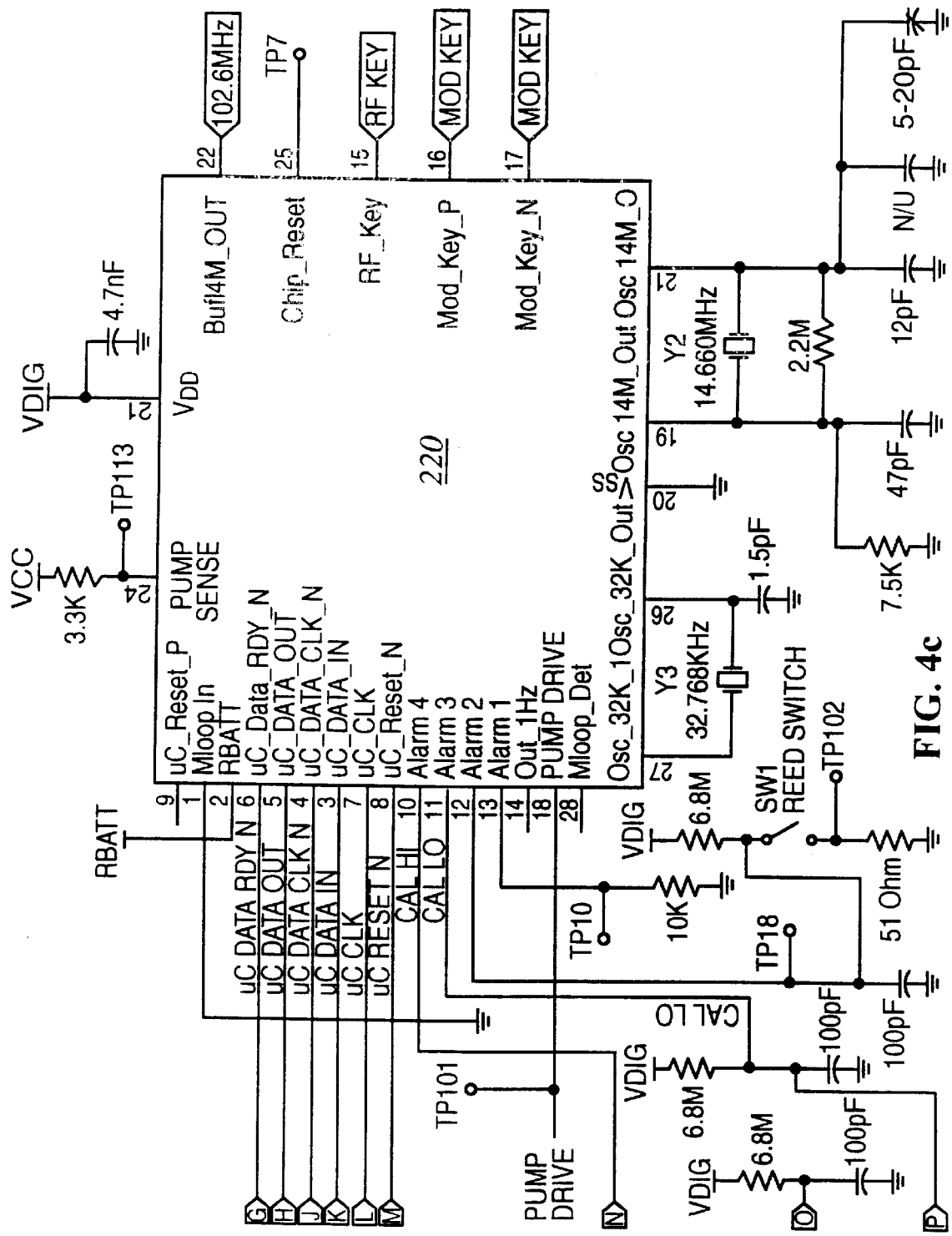

For example, reference cell 44 may have a predetermined (axial) length 45, such as 1 to 2 inches (about 2.5 to 5 cm). Probe capacitor 21 may be of any desired length 23 representing the range of levels capable of being measured. For many fuel tank applications, (axial) length 23 typically ranges from about 36 to 93 inches (about 91.4 to 236.2 cm). The circuitry 22 measures $C_{probe}$ and $C_{ref}$ in air and stores these values in memory 100 (e.g., nonvolatile memory of an EEPROM device as shown in FIG. 4). When the probe 10 is immersed in fluid 12 with a dielectric different than air, the capacitance $C_{ref}$ of the reference cell 44 changes, as does the capacitance $C_{probe}$ of the probe capacitor 21. This change of capacitance per unit length is measured by the circuit 22 and the level may be computed by microprocessor 200 (FIG. 3) using the following Equation (1):

$$Level = 2*((Cprobe - Cprobeair)/(Crefcell - Crefcellair)) \qquad \text{Eq. 1}$$

Equation 1 theoretically generates the desired result because the reference cell 44 has the same radial dimensions as the probe capacitor 21, the reference cell 44 and the capacitor 21 are both immersed in the same type of fluid 12, and their capacitance change per unit length is nominally identical. The constant "2" in the above Equation 1 corresponds to the length 45 (which in this example is 2 inches). The probe 10 is auto-calibrating because the dielectric of the fluid 12 falls out of the level equation Eq. 1, (i.e., because Eq. 1 is ratiometric). As such, the level measurement is independent of the dielectric of the fluid, so it may be used in fluids of many types without further calibration.

A difficulty associated with this configuration is that wire 56 extending from the reference cell 44 to the electronics 22 adds a variable, temperature dependent parasitic capacitance shown as $C_{parasitic}$ in FIGS. 1 and 2. This parasitic capacitance also varies as the level of fluid 12 changes. This capacitance may thus generate a relatively large error since level equation Eq. 1 does not take this parasitic term into consideration. The circuitry 22 of the present invention advantageously serves to eliminate this potential error.

Figure 2B:
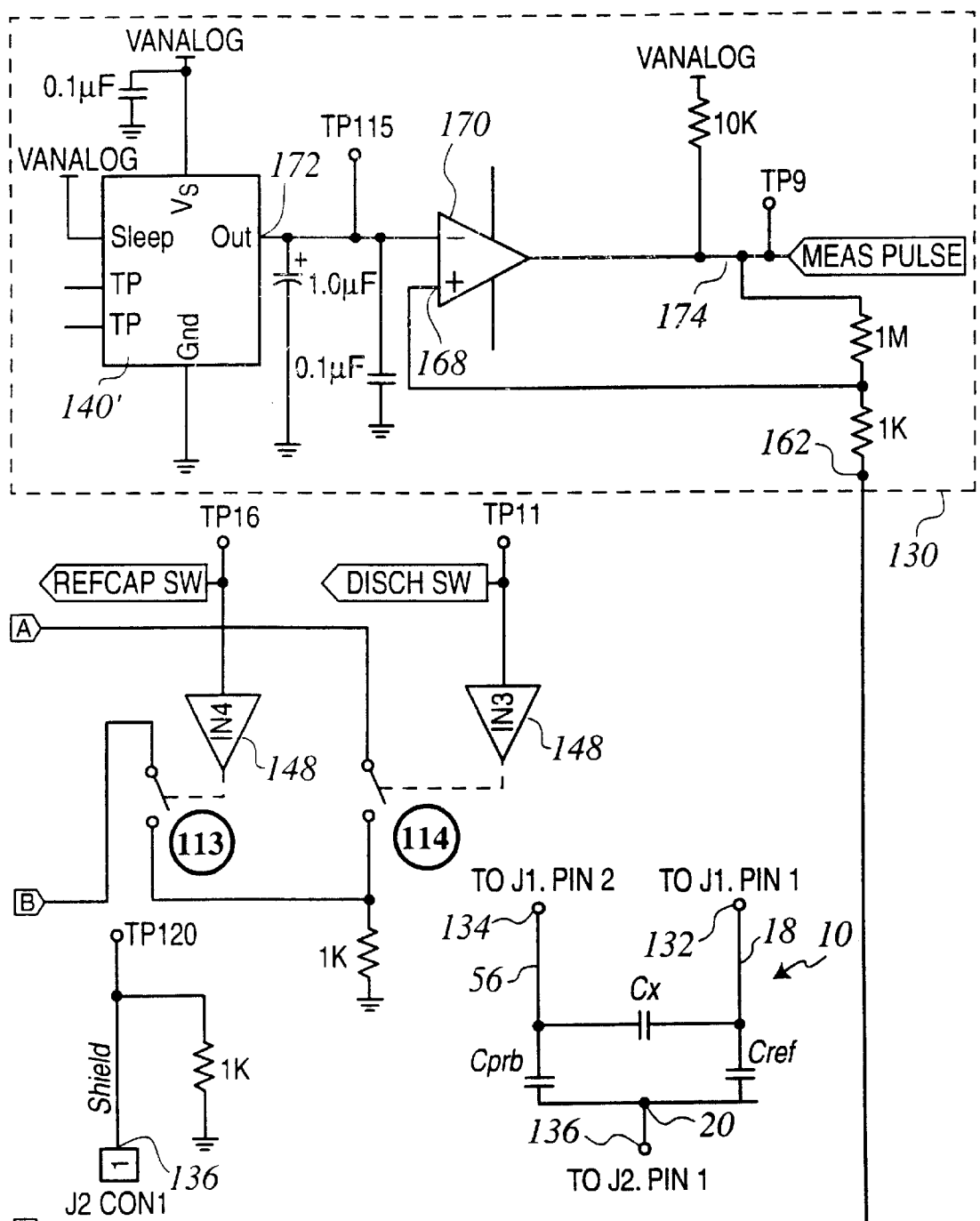
FIG. 2B is a schematic representation of the electrical wiring of the capacitance probe of FIG. 1.

Circuitry 22 will now be described in greater detail with reference to FIGS. 2A–2B. Circuitry 22 includes a current source 110, a selection/shield drive portion 120, and a threshold detector 130. As shown in FIG. 2B, conductors 18 and 56 of probe assembly 10 (FIG. 1) are connected to terminals 132 and 134, respectively, of drive portion 120. Shield 20 of probe 10 is connected to terminal 136 of drive portion 120.

Referring now to FIG. 2A in particular, specific componentry of circuitry 22 is described along with the following functional description thereof. The skilled artisan will recognize that various componentry described herein, such as op-amps and voltage references, typically require power supplies which, according to common practice, may not be explicitly shown in the Figures. In the particular embodiment shown and described, the skilled artisan should recognize that such componentry may be powered by any suitable power supply, such as, for example, an analog 5.0 volt power supply that may be referred to in the Figs. as 'VANALOG'.

As shown, current source 110 may be a high output impedance current source capable of delivering a constant current of 60 nanoamperes (nA) to drive portion 120, through output pin 136. In the particular embodiment shown, current source 110 includes an Operational Amplifier (Op-Amp) 138, and a voltage reference 140 that produces 2.0 volts at pin 142 relative to pin 144. Current source 110 also includes capacitors C52, C47, resistors R16, R24, and a capacitor C37. Resistors R24 and R16 serve to divide the reference voltage (2.0 volts) down to approximately 0.6 volts, which appears across resistor R22. In the particular embodiment shown, resistor R22 has a resistance of nominally 10 MegOhm (M). The 0.6 volts across the 10M resistor generates a current at output 136 of nominally 60 nA.

Current source 110 may be selectively applied to either the probe capacitor 21 or the reference cell 44, using analog switches 111–116 of drive 120, as discussed hereinbelow. By sequencing these switches, the 60 nA constant current may be respectively applied to connector pin 132, pin 134, or ground.

The sequence of closures of switches 111–116 is controlled by microcontroller 200 (FIG. 3), which is coupled by output port 151 thereof to control inputs on each analog switch 111–116. These control inputs are respectively labeled PROBE SW, REFCELL SW, REFCAP SW, DISCH SW, DSR SW, and DSP SW, and are each coupled to a switch actuator 148. Switch actuators 148 operate in a conventional manner to alternately open and close the particular switch 111–116 connected thereto, in response to signals from the microcontroller 200.

At the beginning of the measurement sequence (also referred to a 'reset' state) switches 111, 112, 113, and 114 are closed and switches 115 and 116 are open. This provides a path to ground through resistor R18 for the 60 nA current source 110, and also serves to ground pins 134 and 132 to discharge the probe capacitor 21 and reference cell 44 (FIG. 1). In this state the voltage at pin 154 of op-amp 138 is nominally (within the compliance of the op-amp 138) at zero volts. Since, in the particular embodiment shown, op-amp 138 is a single supply device, the voltage is within about 20 mV of ground. This places pin 144 of voltage reference 140 nominally at ground. (As will be discussed in greater detail hereinbelow, since pin 154 follows the voltage at output 136, the voltage at pin 144 also may increase during measurement of probe capacitor 21. Reference 140 similarly increases the voltage at its pin 142 to maintain the 2.0 volt differential between pins 142 and 144.)

In this 'reset' state, the current supplied by source 110 flows to ground through R18 since switches 111 thru 114 are closed. The probe measurement sequence may now begin with the microcontroller 200 closing switches 111, 113, and 116, and opening switches 112, 114, and 115. An op-amp 152, which is coupled to switch 115 at pin 156 thereof, is configured as a voltage follower so that the voltage at the pin 156 is, within the offset voltage of the op-amp 152, nominally the same as the voltage at pin 154 of op-amp 138. Since op-amp 138 is also configured as a voltage follower, the voltage at pin 154 of op-amp 138 is nominally the same as the voltage at output 136. This loop forces the voltage at pin 154 of op-amp 152 to follow the voltage at output 136. Thus, in this 'probe measurement' state (i.e., with switches 111, 113, and 116 closed, and switches 112, 114, and 115 open), the 60 nA current now flows from output 136 through resistor R21 into the probe capacitor 21 connected at pin 134.

This current flow forces the voltage across the probe capacitor 21 (e.g., between pin 134 and pin 136) to linearly increase. The closure of switch 116 serves to maintain the voltage across the reference cell 44 (connected at pin 132) at the same level as the voltage across the probe capacitor 21 (as this probe capacitor voltage increases). Moreover, this voltage level is maintained in cell 44 while current required to charge the reference cell 44 is supplied by op-amp 152 (i.e., at pin 156 thereof) rather than the 60 nA current source 110. Advantageously, this functionality effectively maintains the voltage across $C_{parasitic}$ (i.e., across conductors 56 and 18 in FIG. 1) at zero volts even as the voltage across probe capacitor 21 linearly increases (i.e., during the 'ramping period'). This active nulling of the voltage across $C_{parasitic}$ effectively prevents any current from (i.e., generates a current of zero nA) flowing through $C_{parasitic}$ so that nominally all of the 60 nA current flows into the probe capacitor 21. Closure of switch 113 also applies the voltage at pin 156 of op-amp 152 to the grounded side of reset switch 114 to similarly null any parasitic capacitance generated by switch 114 while switch 114 is open.

Since pin 136 is grounded, the increase in voltage across the probe capacitor 21 generates an increase in the voltage at pin 160 of op-amp 152 (and pin 144 of reference 140 connected thereto). As mentioned hereinabove, since reference 140 generates a constant 2.0 volt differential between pins 142 and 144, any increase in voltage at pin 144 will result in a similar voltage increase at pin 142. This increasing output serves to maintain the current flow at pin 136 at the aforementioned 60 nA during this 'ramping' or probe measurement period.

The voltage across the probe capacitor 21 (e.g., as taken at pin 160) is fed to input pin 162 of threshold detector 130. This voltage is fed to input pin 168 of a comparator 170. In the particular embodiment shown, comparator 170 includes an op-amp similar to op-amps 138 and 152, operated in non-feedback mode. The comparator 170 compares the probe voltage at pin 168 to the (e.g., 2.0 volt) output at pin 172 of a reference source 140'. (Reference source 140 is substantially similar to reference source 140 described hereinabove with respect to current source 110.) Resistors R28 and R29 may be used to provide a small amount of positive feedback around the threshold detector to prevent false triggering due to noise. When the probe voltage at pin 168 reaches 2.0 volts (i.e., the voltage at pin 168 becomes equal to the voltage at 172), the comparator generates a signal at output 174 of the comparator (e.g., output 174 switches 'high'.) This signal, sometimes referred to herein as 'MEAS PULSE', is input to a timer (e.g., a 16 bit timer) 178 of the microcontroller 200 (FIG. 3). Timer 178 measures the time difference "t" between the closure of switch 111 and receipt of the MEAS PULSE signal. Using this timing information, the microcontroller 200 may compute the capacitance of the probe from the following Equation (2a):

$$C = \frac{It}{V} \qquad \text{Eq. 2a}$$

where, in the particular embodiment shown, I is the current generated by current source 110 (e.g., 60 nA), t is the time difference as stated above, and v is the threshold voltage supplied by reference 140' (e.g., 2.0 volts).

The closure of switch 113 during the probe measurement process nulls out parasitic capacitance of the reset switch 114, which as discussed hereinabove, is used to ground the 60 nA current during the 'reset' state. Since, as discussed, the current into the probe capacitor 21 is constant and the time this current flows into the capacitor 21 is measured, the resolution of measurement is constant, regardless of the size of the probe capacitor 21.

The capacitance $C_{ref}$ of reference cell 44 is measured in a manner that is substantially similar to measuring $C_{probe}$ as discussed hereinbove, excepting that switches 112, 113, and 115 are closed, and switches 111, 114, and 116 are opened. In this manner, the 60 nA current generated by current source 110 is supplied to pin 132 for the reference cell 44, rather than to pin 134 for the probe capacitor 21.

Temperature Correction

Due to the sensitive nature of the measurement circuitry 22, relatively large changes in ambient temperature (and humidity) may generate measurement errors. These errors generally result from temperature-induced offset voltage drifts in the op-amps 138, 152, 170, capacitances between various circuit board-mounted components, and changes in humidity that affect the surface conductivity of the circuit board. These temperature and/or humidity influenced parasitic capacitances (i.e., parasitics other than the $C_{parasitic}$ described hereinabove) are collectively referred to herein as 'parasitic board capacitances'. In order to compensate for these changes as a function of temperature and humidity, microcontroller 200 may be provided with computer readable program code (software) that measures the parasitic board capacitances at calibration and stores these values (e.g., in EEPROM 100 of FIG. 4).

These parasitic board measurements are performed in substantially the same manner as a probe measurement or reference cell measurement with the following exception. During a parasitic board capacitance measurement, the switches 111–116 are configured as stated hereinabove with respect to measurement of $C_{probe}$, except switch 111 is open. This forces the 60 nA current to flow into the the probe measurement circuitry (without flowing into the probe capacitor 21), to allow the parasitic board capacitance associated with the probe measurement circuitry to be measured as a function of time and temperature. Similarly, the parasitic capacitance associated with the reference cell circuitry is measured as stated hereinabove with respect to measurement of $C_{ref}$, except switch 112 is open. These runtime values (Cprobecal and Crefcal in Equation 3) are affected by temperature and humidity and they may be measured as the instrument operates in order to compensate for changes therein. During the measurement cycle, these calibration values, e.g., 'Cprobecal' and 'Crefcal', may be retrieved (e.g., from the EEPROM 100) and used to modify the above-referenced level equation (Eq. 1) to produce the following enhanced level equation (Eq. 3):

$$Level=2*(((Cprobe-Cprobeair)-Cprobecal)/((Crefcell-Crefcellair)-Crefcal)) \qquad \text{Eq. 3}$$

This modified level calculation may advantageously utilize the stored parasitic board capacitance calibration values nominally every time a level calculation is performed, for enhanced measurement accuracy. In the event these parasitics change as a function of temperature and/or humidity, this modified level equation (Eq. 3) provides a temperature correction term in real time. Exemplary software used to implement this function is included in the Appendix attached hereto.

In the particular embodiment shown in FIGS. 3 and 4, microprocessor 200 may function as a 'slave' processor coupled by interface port 180 (FIG. 3) to port 182 of a 'master' microprocessor 210 (FIG. 4). As also shown, EEPROM 100 is coupled directly to microprocessor 210. In this configuration, master microprocessor 210 may provide the slave processor 200 with power, a clock pulse, and access to the EEPROM 100. Master microprocessor 210 may also control a wireless module (e.g., an ASIC) 220 configured to enable the probe 10 to operate wirelessly by RF or other wireless means. The skilled artisan will recognize that in alternate embodiments, the present invention may be configured without dual Master/Slave processors and/or without wireless capability. For example, a single processor 200 may be used, having the EEPROM 100 or other memory storage device coupled directly thereto, with or without wireless module 220.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Appendix - Software Code Listing

```
/*******************************************
*
* Project: Centeron
* File Description: This file contains functions
*    to perform the measurements.
*
* $Archive: $
* $Workfile: $
* $Revision: $
* $Date: $
*
*******************************************
```

-continued

Appendix - Software Code Listing

```c
*
* $History: $
*
***************************************************/
#include <pic.h>
#include "app.h"
#include "cmd.h"
#define READPROBE         0b00010100
#define READPROBEAIR      0b00010000
#define READREFCELL       0b00001010
#define READREFCELLAIR    0b00000010
#define MAXTIMEROVERFLO   10
#define NUMBEROFREPEATS   128
#define BADMEASVAL        99999
#define H2OLIMIT          775
#define OPENRATIO         0.6
extern void TimeDelay( unsigned int wMaxCount );
extern unsigned char bDummy;
extern unsigned int wDummy;
extern unsigned long ulDummy;
unsigned long ulMeasurement;
//
//************************************************************************
**
// MODULE        : Measure
// AUTHOR        : Steve Tymoszuk
// DESCRIPTION   : Function to performed the desired measurement.
// LIMITATIONS   : none
// INPUTS        : wSwSet - measurement mask
// OUTPUTS       : measurement value
// REVISION HISTORY :
// Rev #     Name              Date            Reason
// -----     ----------------  --------------  -------------------------
//   1       Steve Tymoszuk    24 March 2000   Original
//
//************************************************************************
**/
unsigned long Measure( unsigned int wSwSet )
{
    unsigned long ulResult;
    unsigned char bTemp;
    wTimerOverFlow = 0;         //Clear timer over flow counter
    T1CON = 0x00;               //Timer 1 off.
    TRISC |= 0x04;                  //make RC2/ccp1 an input
    TRISC & = 0xFE;                 //make RC0 an output
    TRISB & = 0xE0;                 //make RB0-RB4 outputs
    TMR1IF = 0x0;               //Clear timer1 overflow flag
    PIE1 = 0x1;                 //Disable all interrupts except
for timer1 overflow
    INTCON = 0x0;               //Disable all interrupts except
for timer1 overflow
    CCP1CON = 0b00000101;           //setup ccp1 for no prescaler
ie.every rising edge
    TMR1L = 0x0;                //clear low byte of timer1
    TMR1H = 0x0;                //clear high byte of timer1
    CCP1IF =0x0;                //clear ccp1 event flag
    PEIE = 1;                       //Interrupt enable
    GIE = 0x1;                      //enable global interrupts
(for timer1 overflow ONLY)
    bTemp = PORTB & 0xC0;
    bTemp = bTemp | 0b00001101;
    PORTB = bTemp;              //Start probe integrate cycle.
    TimeDelay( 100 );                   //wait a spell
    bTemp = PORTB & 0xC0;
    bTemp = bTemp | wSwSet;
    PORTB = bTemp;              //Start probe integrate cycle.
    PORTC | = 0x01;
    T1CON = 0x01;               //Start Timer1
    while ( !CCP1IF )               //Wait for CCP1 event flag.
    {
        /* wait */
    }
    CCP1IF = 0X00;
    T1CON = 0x00;               //Stop Timer1
    ulResult = ( ( unsigned long ) CCPR1H << 8 );
    ulResult += ( unsigned long ) CCPR1L;
```

-continued

Appendix - Software Code Listing

```
    ulResult += ( ( unsigned long ) wTimerOverFlow << 16 );
    if( wTimerOverFlow >= ( MAXTIMEROVERFLO - 1 ) )
    {
        ulResult = BADMEASVAL;
    }
    PORTC & = 0xFE;
    bTemp = PORTB & 0xC0;
    bTemp = bTemp | 0b00001101;
    PORTB = bTemp;              //Reset integrator.
    TimeDelay ( 20 );
    return ( ulResult );
}
//
//***********************************************************************
**
// MODULE          : MeasureProbe
// AUTHOR          : Steve Tymoszuk
// DESCRIPTION     : Function to perform an averaged probe
measurement.
// LIMITATIONS     : none
// INPUTS          : bCode - the error code
// OUTPUTS         : none
// REVISION HISTORY :
// Rev #      Name            Date            Reason
// -----      ----------      ----------      -----------------
---
//   1        Steve Tymoszuk  24 March 2000   Original
//
//***********************************************************************
**/
unsigned char MeasureProbe( void )
{
    unsigned char bCnt;
    unsigned char bResult;
    bResult = MEAS_OK;
    ulAveprobe = 0;
    //Read Probe only.
    for ( bCnt = 0; bCnt < NUMBEROFREPEATS; bCnt++ )
    {
            ulMeasurement = Measure ( READPROBE );
            ulAveprobe += ulMeasurement;
        if ( (float) ulMeasurement <= ( (float) wCalProbe * OPENRATIO ) )
        {
            return ( MEAS_OPENPROBEFLT );
        }
        if( ulMeasurement == BADMEASVAL )
        {
            return ( MEAS_SHORTPROBEFLT );
        }
        /* Throw the dog a bone */
        HitWD ();
        ReadDataFrom62 ();
    }
    /* calculate the average */
    ulAveprobe = ulAveprobe / NUMBEROFREPEATS;
    TimeDelay ( 1 );
    /* Throw the dog a bone */
    HitWD ();
    ReadDataFrom62 ();
    return( bResult );
}
//
//***********************************************************************
**
// MODULE          : MeasureProbeAir
// AUTHOR          : Steve Tymoszuk
// DESCRIPTION     : Function to perform an averaged probe board
measurement.
// LIMITATIONS     : none
// INPUTS          : none
// OUTPUTS         : none
// REVISION HISTORY :
```

-continued

Appendix - Software Code Listing

```
// Rev #          Name              Date            Reason
// -----          ----------------  --------------  ------------------------
---
//    1           Steve Tymoszuk    24 March 2000   Original
//
//************************************************************************
**/
void MeasureProbeAir ( void )
{
    unsigned char bCnt;
    ulAveprobeair = 0;
    for( bCnt = 0; bCnt < NUMBEROFREPEATS; bCnt++ )
    {
        ulAveprobeair += Measure ( READPROBEAIR );
        /* Throw the dog a bone */
        HitWD ();
        ReadDataFrom62 ();
    }
    /* calculate the average */
    ulAveprobeair = ulAveprobeair / NUMBEROFREPEATS;
    TimeDelay ( 1 );
    /* Throw the dog a bone */
    HitWD ();
    ReadDataFrom62 ();
}
//
//************************************************************************
**
// MODULE           : MeasureRef
// AUTHOR           : Steve Tymoszuk
// DESCRIPTION      : Function to perform an averaged ref cell
measurement.
// LIMITATIONS      : none
// INPUTS           : none
// OUTPUTS          : none
// REVISION HISTORY :
// Rev #          Name              Date            Reason
// -----          ----------------  --------------  ------------------------
---
//    1           Steve Tymoszuk    24 March 2000   Original
//
//************************************************************************
**/
unsigned char MeasureRef ( void )
{
    unsigned char bCnt;
    unsigned char bResult;
    bResult = MEAS_OK;
    ulAveref = 0;
    //Read Ref cell only.
    for ( bCnt = 0; bCnt < NUMBEROFREPEATS; bCnt++ )
    {
        ulMeasurement = Measure ( READREFCELL );
        if( (float)ulMeasurement <= ( (float)wCalRef * OPENRATIO ) )
        {
            return( MEAS_OPENREFELT );
        }
        if( ulMeasurement == BADMEASVAL )
        {
            return ( MEAS_SHORTREFELT );
        }
        ulAveref += ulMeasurement;
        /* Throw the dog a bone */
        HitWD ();
        ReadDataFrom62 ();
    }
    /* calculate the average */
    ulAveref = ulAveref / NUMBEROFREPEATS;
    TimeDelay( 1 );
    /* Throw the dog a bone */
    HitWD ();
    ReadDataFrom62 ();
if( ( ulAveref < (unsigned long)wCalRef ) )
    {
        return( MEAS_MEASFLT );
    }
    if( H2O_PIN == HI )
```

Appendix - Software Code Listing (continued)

```
        {
            if( ( ulAveref > (unsigned long)wCalRef ) )
            {
                if( ( ulAveref - (unsigned long)wCalRef ) >= H2OLIMIT )
                {
                    bResult = MEAS_H20;
                }
            }
        }
        return( bResult );
}
//
//*************************************************************************
**
// MODULE              : MeasureRefAir
// AUTHOR              : Steve Tymoszuk
// DESCRIPTION         : Function to perform an averaged ref cell air
measurement.
// LIMITATIONS         : none
// INPUTS              : none
// OUTPUTS             : none
// REVISION HISTORY    :
/ Rev #        Name              Date            Reason
// -----       ----------------  --------------  ------------------------
---
//   1         Steve Tymoszuk    24 March 2000   Original
//
//*************************************************************************
**/
void MeasureRefAir( void )
{
    unsigned char bCnt;
    ulAverefair = 0;
    for( bCnt = 0; bCnt < NUMBEROFREPEATS; bCnt++ )
    {
        ulAverefair += Measure ( READREFCELLAIR );
        /* Throw the dog a bone */
        HitWD ();
        ReadDataFrom62 ();
    }
    /* calculate the average */
    ulAverefair = ulAverefair / NUMBEROFREPEATS;
    TimeDelay ( 1 );
    /* Throw the dog a bone */
    HitWD ();
    ReadDataFrom62 ();
}
/***********************************************
 *
 * Project: Centeron
 * File Description: This file contains misc.
 *     functions used in the RF Cap monitor.
 *
 * $Archive: $
 * $Workfile: $
 * $Revision: $
 * $Date: $
 *
 ***********************************************
 *
 * $History: $
 *
 ***********************************************/
#include "app.h"
#define      CPROBECAL          ( float ) ( wCalProbe - wCalProbeBoard )
#define      CREFCAL            ( float ) ( wCalRef - wCalRefBoard )
#define   MINDIELECTRIC 120.0
//
//*************************************************************************
**
// MODULE              : TimeDelay
// AUTHOR              : Steve Tymoszuk
// DESCRIPTION         : General purpose delay routine.
// LIMITATIONS         : none
// INPUTS              : unsigned int wMaxCount
// OUTPUTS             : none
// REVISION HISTORY    :
```

-continued

Appendix - Software Code Listing

```
// Rev #         Name              Date             Reason
//-----         ----------------  --------------   -------------------------
---
//  1           Steve Tymoszuk    15 Mar 2000      Original
//
//*************************************************************************
**/
void TimeDelay( unsigned int wMaxCount )
{
    unsigned int wCnt;
    /* waste some time */
    for( wCnt = 0; wCnt < wMaxCount; wCnt++ );
}
//
//*************************************************************************
**
// MODULE            : CalcAutoCalLevel
// AUTHOR            : Steve Tymoszuk
// DESCRIPTION       : Function to perform the level calculation for
auto cal
//                      probe.
// LIMITATIONS       : none
// INPUTS            : none
// OUTPUTS           : none
/ REVISION HISTORY  :
// Rev #         Name              Date             Reason
//-----         ----------------  --------------   -------------------------
---
//  1           Steve Tymoszuk    15 Mar 2000      Original
//
//*************************************************************************
**/
void CalcAutoCalLevel ( void )
{
    /* Do calculations for actual length */
    /* Temperature compensated level computations */
        flDenom = ( (float)ulAveref - (float)ulAverefair ) -
(float) CREFCAL;
    if(flDenom > MINDIELECTRIC)
    {
        flNumer = ( (float)ulAveprobe - (float)ulAveprobeair) -
(float) CPROBECAL;
        flLevel = flSpanCal * ( flNumer / flDenom);
    }
    else
    {
        flLevel = 0;
    }
    if (flLevel < 0.1)
    {
        flLevel = 0;
    }
    f1Level = flLevel * 10;
    if( wProbeLength < (unsigned int)flLevel )
    {
        wAir = 0;
    }
    else
    {
        wAir wProbeLength - (unsigned int)flLevel;
//  wAir = (unsigned int)flLevel;
    }
}
//
//*************************************************************************
**
// MODULE            : Calc2PtLevel
// AUTHOR            : Steve Tymoszuk
// DESCRIPTION       : Function to perform the level calculation for 2
pt
//                      probe.
// LIMITATIONS       : none
// INPUTS            : none
// OUTPUTS           : none
// REVISION HISTORY  :
```

-continued

Appendix - Software Code Listing

```
// Rev #         Name              Date          Reason
// -----         ----------------  ------------  ------------------------
//
//   1           Steve Tymoszuk    15 Mar 2000   Original
//
//*************************************************************************
**/
void Calc2PtLevel( void )
{
        flDenom = ( (float)ulCapHi - (float)ulCapLo );
    if(flDenom <= 0 )
    {
        wAir = 9999;
    }
    else
    {
        flNumer = ( (float)wLevHi - (float)wLevLo );
        if( ulAveprobe < ulCapLo )
        {
            wAir = wProbeLength;
        }
        else
        {
            if( ( ulAveprobe - ulCapLo ) > ( ulCapHi - ulCapLo ) )
            {
                wAir = 0;
            }
            else
            {
                flLevel = ( ulAveprobe - ulCapLo ) * ( flNumer / flDenom
);
                flLevel = flLevel + (float)wLevLo;
                if( (unsigned int)flLevel > wProbeLength )
                {
                    wAir = 0;
                }
                else
                {
                    wAir = wProbeLength - (unsigned int)flLevel;
                }
            }
        }
    }
}
```

Having thus described the invention, what is claimed is:

Having thus described the invention.
What is claimed is:
1. A capacitance measurement circuit comprising:
a drive circuit including:
a power port couplable to a constant-current source;
a detector port couplable to a threshold detector;
a probe port couplable to a probe capacitor;
a reference port couplable to a reference capacitor;
a plurality of switches being actuatable to alternately couple said power port to said probe port and to said reference port;
said drive circuit being configured to alternately generate a signal of linear ramp waveform having a slope that is proportional to the magnitude of capacitance of a probe capacitor and reference capacitor coupled to said probe port and to said reference port; and
said drive circuit being configured to substantially eliminate parasitic capacitance between the reference capacitor and the probe capacitor.
2. The circuit of claim 1, comprising a constant-current source coupled to said power port.
3. The circuit of claim 1, comprising:
a probe capacitor coupled to said probe port; and
a reference capacitor coupled to said reference port.
4. The circuit of claim 3, wherein said probe capacitor comprises a pair of integral electrodes.
5. The circuit of claim 4, wherein said pair of integral electrodes are electrically isolated from a container into which said probe capacitor may be disposed.
6. The circuit of claim 4, wherein said reference capacitor comprises an other pair of integral electrodes.
7. The circuit of claim 6, wherein said other pair of integral electrodes are electrically isolated from a container into which said reference capacitor may be disposed.
8. The circuit of claim 6, wherein said probe capacitor and said reference capacitor comprise an integrated unit in which one electrode is common to both said pair, and to said other pair, of integral electrodes.
9. The circuit of claim 1, being configured to maintain a voltage differential of substantially zero volts between the reference capacitor and the probe capacitor.
10. The circuit of claim 1, further comprising a threshold detector coupled to said detector port, said threshold detector being configured to indicate when the linear ramp waveform reaches a threshold.
11. The circuit of claim 10, wherein the signal comprises a linear ramp voltage waveform in which the voltage varies linearly therealong, and said threshold detector is configured to indicate when the signal reaches a threshold voltage.

12. The circuit of claim 11, further comprising a timer to measure time elapsed between coupling said constant-current source to one of the probe and reference capacitors, and the signal reaching the threshold.

13. The circuit of claim 12, comprising a microprocessor configured to actuate said switches and to measure said time elapsed.

14. The circuit of claim 13, wherein said microprocessor is configured to calculate a level of material into which the probe capacitor is immersed.

15. The circuit of claim 14, wherein said microprocessor uses said magnitude of capacitance of the probe capacitor and reference capacitor to calculate the level of material.

16. The circuit of claim 15, wherein said microprocessor implements a ratiometric equation.

17. The circuit of claim 16, wherein said microprocessor implements the equation:

$$Level=2*((Cprobe-Cprobeair)/(Crefcell-Crefcellair)).$$

18. The circuit of claim 16, comprising computer readable program code configured to compensate for parasitic board capacitances.

19. The circuit of claim 18, wherein said computer readable program code comprises:

computer readable program code to determine a value of the parasitic board capacitances;

computer readable program code to store said value;

computer readable program code to retrieve said value during a measurement cycle; and computer readable program code to incorporate said value to calculate the level of material.

20. The circuit of claim 18, wherein said computer readable program code implements the equation:

$$Level=2*(((Cprobe-Cprobeair)-Cprobecal)/((Crefcell-Crefcellair)-Crefcal)).$$

21. A capacitance probe comprising the capacitance measurement circuit of claim 1.

22. The probe of claim 21, comprising:

a constant-current source coupled to said power port;

a probe capacitor coupled to said probe port;

a reference capacitor coupled to said reference port;

a threshold detector coupled to said detector port, said threshold detector being configured to indicate when the linear ramp waveform reaches a threshold;

wherein said circuit is configured to maintain a voltage differential of substantially zero volts between the reference capacitor and the probe capacitor to substantially eliminate parasitic capacitance therebetween.

23. A capacitance measurement circuit comprising:

a constant-current source;

a threshold detector being configured to indicate when a linear ramp waveform reaches a threshold voltage;

a drive circuit coupled to said constant-current source and to said threshold detector, said drive circuit including:
a probe port couplable to a probe capacitor;
a reference port couplable to a reference capacitor;
a plurality of switches configured to alternately couple said constant-current source to said probe port and to said reference port;

said drive circuit being configured to generate the signal of linear ramp waveform having a slope that is proportional to the magnitude of capacitance of the probe capacitor and reference capacitor alternatively coupled thereto; and said drive circuit being configured to substantially eliminate parasitic capacitance between the reference capacitor and the probe capacitor.

24. A method of fabricating a capacitance measurement circuit, said method comprising:

providing a drive circuit including:
a power port couplable to a constant-current source;
a detector port couplable to a threshold detector;
a probe port couplable to a probe capacitor;
a reference port couplable to a reference capacitor;
a plurality of switches being actuatable to alternately couple said power port to said probe port and to said reference port;

configuring the drive circuit to alternately generate a signal of linear ramp waveform having a slope that is proportional to the magnitude of capacitance of a probe capacitor and reference capacitor coupled to said probe port and to said reference port, and:

configuring the drive circuit to substantially eliminate parasitic capacitance between the reference capacitor and the probe capacitor.

25. A method of determining the capacitance of a capacitance probe, said method comprising:

providing a drive circuit;

coupling a constant-current source to the drive circuit;

coupling a probe capacitor to the selection/drive circuit;

coupling a reference capacitor to the selection/drive circuit;

providing the selection/drive circuit with a plurality of switches being actuatable to alternately couple the constant-current source to the probe capacitor and to the reference capacitor;

configuring the drive circuit to alternately generate a signal of linear ramp waveform having a slope that is proportional to the magnitude of capacitance of a probe capacitor and reference capacitor coupled to said probe port and to said reference port;

actuating the switches to alternately couple the constant-current source to the probe capacitor and to the reference capacitor; and using the drive circuit to alternately generate a signal of linear ramp waveform having a slope that is proportional to the magnitude of capacitance of a probe capacitor and reference capacitor; and maintaining a voltage differential of substantially zero volts between the reference capacitor and the probe capacitor during said use of the drive circuit.

* * * * *